United States Patent
McClendon et al.

(10) Patent No.: US 7,577,862 B2
(45) Date of Patent: Aug. 18, 2009

(54) SELF ADJUSTING CLOCKS IN COMPUTER SYSTEMS THAT ADJUST IN RESPONSE TO CHANGES IN THEIR ENVIRONMENT

(75) Inventors: Thomas W. McClendon, Plano, TX (US); Christian L Belady, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 476 days.

(21) Appl. No.: 11/095,826

(22) Filed: Mar. 30, 2005

(65) Prior Publication Data

US 2005/0172158 A1 Aug. 4, 2005

Related U.S. Application Data

(62) Division of application No. 09/982,585, filed on Oct. 17, 2001, now abandoned.

(51) Int. Cl.
G06F 1/00 (2006.01)
G06F 1/26 (2006.01)
G06F 1/32 (2006.01)

(52) U.S. Cl. ........................ 713/500; 713/300; 713/320; 713/322

(58) Field of Classification Search ................. 713/500, 713/300, 320, 322
See application file for complete search history.

(56) References Cited

U.S. PATENT DOCUMENTS

| | | | | |
|---|---|---|---|---|
| 4,323,987 | A * | 4/1982 | Holtz et al. ................. | 365/229 |
| 4,942,604 | A * | 7/1990 | Smith et al. ................. | 379/412 |
| 5,798,667 | A * | 8/1998 | Herbert ...................... | 327/573 |
| 6,415,388 | B1 * | 7/2002 | Browning et al. ........... | 713/322 |
| 6,457,082 | B1 * | 9/2002 | Zhang et al. ................ | 710/260 |
| 6,621,180 | B2 * | 9/2003 | Dishman et al. ............. | 307/64 |
| 6,647,117 | B1 * | 11/2003 | Wallace et al. .............. | 379/413 |
| 6,684,339 | B1 * | 1/2004 | Willig ........................ | 713/300 |
| 6,701,272 | B2 | 3/2004 | Cooper et al. | |
| 6,792,489 | B2 * | 9/2004 | Osburn et al. ............... | 710/104 |
| 6,880,093 | B1 * | 4/2005 | Lyles ......................... | 713/300 |
| 2003/0126335 | A1 * | 7/2003 | Silvester ..................... | 710/303 |

* cited by examiner

Primary Examiner—Thomas Lee
Assistant Examiner—Michael J Brown

(57) ABSTRACT

An electronic device such as a computer, circuit board, or integrated circuit is built including circuitry for receiving temperature information. The clock frequency of the electronic device is varied in response to the temperature of the electronic device, thus lowering speed and power consumption of the device during periods of higher than normal temperature. Alternately, an electronic device such as a computer, circuit board, or integrated circuit is built including circuitry for receiving power supply information. The clock frequency and possibly the power supply voltage of the electronic device is varied in response to the power supply status of the electronic device, thus lowering speed and power consumption of the device during periods of lower than normal power supply current capability.

20 Claims, 8 Drawing Sheets

SELF ADJUSTING CLOCKS IN COMPUTER SYSTEMS THAT ADJUST IN RESPONSE TO CHANGES IN THEIR ENVIRONMENT

CROSS-REFERENCE TO RELATED APPLICATIONS

This application is a divisional of application Ser. No. 09/982,585 also entitled, "Self Adjusting Clocks in Computer Systems that Adjust in Response to Changes in their Environment," filed on Oct. 17, 2001 now abandoned hereby incorporated herein by reference.

FIELD OF THE INVENTION

This invention relates generally to the field of computer hardware and more specifically to the field of the automatic adaptation of computer hardware to its environment.

BACKGROUND OF THE INVENTION

Modern computer systems typically comprise a number of integrated circuits and other active electronic devices. These integrated circuits are generally fabricated from a semi-conductor material such as silicon and encapsulated in an integrated circuit package for attachment to a printed circuit board. It is well known in the art of integrated circuits and computer systems that the circuits' maximum possible performance may be correlated to the temperature of the device itself. The temperature of the device is driven by the ambient temperature of the air surrounding the device, the altitude of the device, airflow across the device, and self-heating of the device itself during operation. Most integrated circuits may be operated at higher speeds in a cool environment than in a hot environment. When integrated circuits are tested, often some portion of the test is performed at an elevated temperature simulating the maximum allowable temperature during operation in order to provide assurance that the circuit will work properly at its maximum speed in an environment including its maximum allowable temperature. Often, the same device will be capable of performing properly at greater speeds in environments that include temperatures lower than its maximum allowable temperature.

It is also well known in the art of integrated circuits and computer systems that these electronic devices produce heat during their normal operation. Most integrated circuits produce more heat at higher operating frequencies than they do at lower operating frequencies. In many computer systems comprising one or more integrated circuits, cooling these integrated circuits is necessary to insure an operating environment within the allowable temperature range. Cooling may be accomplished in a variety of methods. Many computer systems include fans to move air across the integrated circuit packages. Some integrated circuit packages include heat sinks to help dissipate heat from the integrated circuit through the package and heat sink and into the air moving across the heat sink. Other integrated circuit packages, particularly for circuits dissipating large amounts of power, include channels for water or another liquid to flow through the package removing heat from the circuit. Still other integrated circuits are cooled by immersion cooling, spray cooling, and microchannel cooling on the actual silicon die.

In addition to the desire to control the environment within a computer system, there is a desire to control the environment surrounding the computer system since the fans in a typical computer system simply take air from the environment surrounding the computer system and move it across the electronic devices. If the air surrounding the computer system is very warm, this warm air may be all that is available to cool the computer system and because of the higher ambient temperature, the devices within the computer system may operate at a higher temperature. When large numbers of computer systems are placed in physical proximity to each other, cooling the surrounding air may become critical to ensure that the devices inside each of the computer systems are operating within their temperature specifications. Thus, many users of multiple computer systems place the computer systems together in one room or area that may be cooled sufficiently to allow operation of all of the computer systems within their temperature specifications. These special rooms are often called 'data centers.'

Many data centers include special refrigeration equipment that cools the air within the data center to a level insuring the proper operation of the computer systems within the data center. This special equipment is necessary since many computer systems produce large amounts of heat during operation and without the additional refrigeration equipment, the normal building air conditioning might be unable to remove enough of this heat from the air to allow the computer systems to operate within their temperature specifications. Other facilities include liquid refrigeration equipment plumbed to the computer systems to provide liquid cooling to the devices within the computer systems.

Problems arise when portions of this refrigeration equipment breaks down. The cooling capacity of the refrigeration equipment may be reduced and the air within the data center may rise above the maximum temperature allowed by the computer systems. Most computer systems run at a fixed clock frequency. When the device temperature of their integrated circuits rise, the actual switching capacity of the integrated circuits slows down. Since the latches or registers of these circuits are clocked at a fixed frequency, when the switching slows down too far, the latches and registers may set before their inputs arrive causing them to store incorrect data. This incorrect data may culminate in incorrect results or may cause the computer to shut down and require a reboot.

Other data center problems may arise when the data center is not properly designed, or is used outside of its capabilities. If proper airflow is not maintained through out the data center, some of the computer systems may have a higher ambient air temperature than other systems. When computer systems are placed in close proximity to each other, it is possible that the air intake of one machine may be very near the outflow of an adjacent machine that may flow hot air into the air intake, causing over-heating. The warmer computer systems may be more prone to failure than the cooler systems.

Some computer systems include temperature-sensing circuitry controlling fans within the system. When the temperature rises, these systems increase fan speed to better cool the electronic devices. As the temperature falls, these systems decrease fan speed to save power and reduce the noise of the system fans. However, these systems can only move a limited quantity of air over their circuits and are dependant on the outside environment for their cool air. If the outside environment is too warm, it is possible that the temperature within the computer system will continue rising beyond the cooling capability of the system fans. Once the internal temperature rises above the maximum allowable temperature, the computer system may give a warning and then shut itself down to prevent computing errors or possible damage to the system. Further, reliability may be reduced when computer systems are operated at temperatures outside of their ranges. It is well known in the art that metal migration within integrated circuits increases at elevated temperatures and over time. The longer an integrated circuit is run at an elevated temperature, the greater the chances that a physical failure of the device will occur. Thus, it is desirable to prevent overheating of integrated circuits for extended periods of high temperature operation whenever possible.

Another problem with air-cooled computer systems is that at high elevations, the air is less dense and therefore less efficient in conducting heat away from the devices. Computer systems must be designed to operate properly at high elevations while the vast majority of users never operate their computer systems in such an environment. Thus, a computer system designed to work at 10,000 feet elevation may have the ability to perform at a higher frequency at sea level due to the better cooling capabilities of the dense air at sea level. This computer system used at sea level would then be performing below its actual capabilities, depriving the user of some portion of its performance capabilities.

Many computer systems include extra fans to allow a margin of safety in the event of one or more of the fans failing. Also, many data centers are designed to include extra refrigeration capacity allowing an additional margin of safety in the event that one of the refrigeration units fails. However, even with these precautions, failures still occur, causing the air temperature to rise above the maximum allowed by the computer systems. In these situations, the computer servers may perform improperly or shut down and require a reboot, causing great difficulty for their users. Also, it is possible that a fan failure would result in a heat rise in one part of the system and not another.

Along with extra fans, some computer systems include extra power supplies to provide sufficient power to the system should one or more of the power supplies fail. However, these precautions are very costly and even if used, may still not be sufficient to allow for full performance of the computer system in the event of one or more failures. For example, a system built with one extra power, may have two power supply failures, and not have sufficient current capability remaining to power the system at maximum performance.

SUMMARY OF THE INVENTION

An electronic device such as a computer, circuit board, or integrated circuit is built including circuitry for receiving temperature information. The clock frequency of the electronic device is varied in response to the temperature of the electronic device, thus lowering speed and power consumption of the device during periods of higher than normal temperature. Alternately, an electronic device such as a computer, circuit board, or integrated circuit is built including circuitry for receiving power supply information. The clock frequency and possibly the power supply voltage of the electronic device is varied in response to the power supply status of the electronic device, thus lowering speed and power consumption of the device during periods of lower than normal power supply current capability.

A computer may be designed without extra fans or power supplies, thus reducing the cost of the computer. When a failure occurs in one of the fans or power supplies, the integrated circuits detect the failure and reduce their clock speeds and possibly their power supply voltage automatically in response to power supply failures, cooling equipment failures, altitude, temperature, and other environmental factors. This allows the computer to continue to operate at a slower frequency, but without any loss of data and no need to restart any applications running on the computer. This is especially important for critical servers where an error or failure may be very costly to the user.

Also, if a computer system were able to automatically detect environmental cooling capabilities, it would be possible to design a computer system for full performance at sea level, yet the computer system could automatically adjust for slightly less performance at altitude to allow for the less efficient cooling at high elevations.

Further, if a computer system were able to automatically detect and make allowances for environmental conditions on an individual integrated circuit basis, only part of the computer system would suffer reduced performance due to the environmental conditions.

Other aspects and advantages of the present invention will become apparent from the following detailed description, taken in conjunction with the accompanying drawings, illustrating by way of example the principles of the invention.

DETAILED DESCRIPTION

Figure 1:
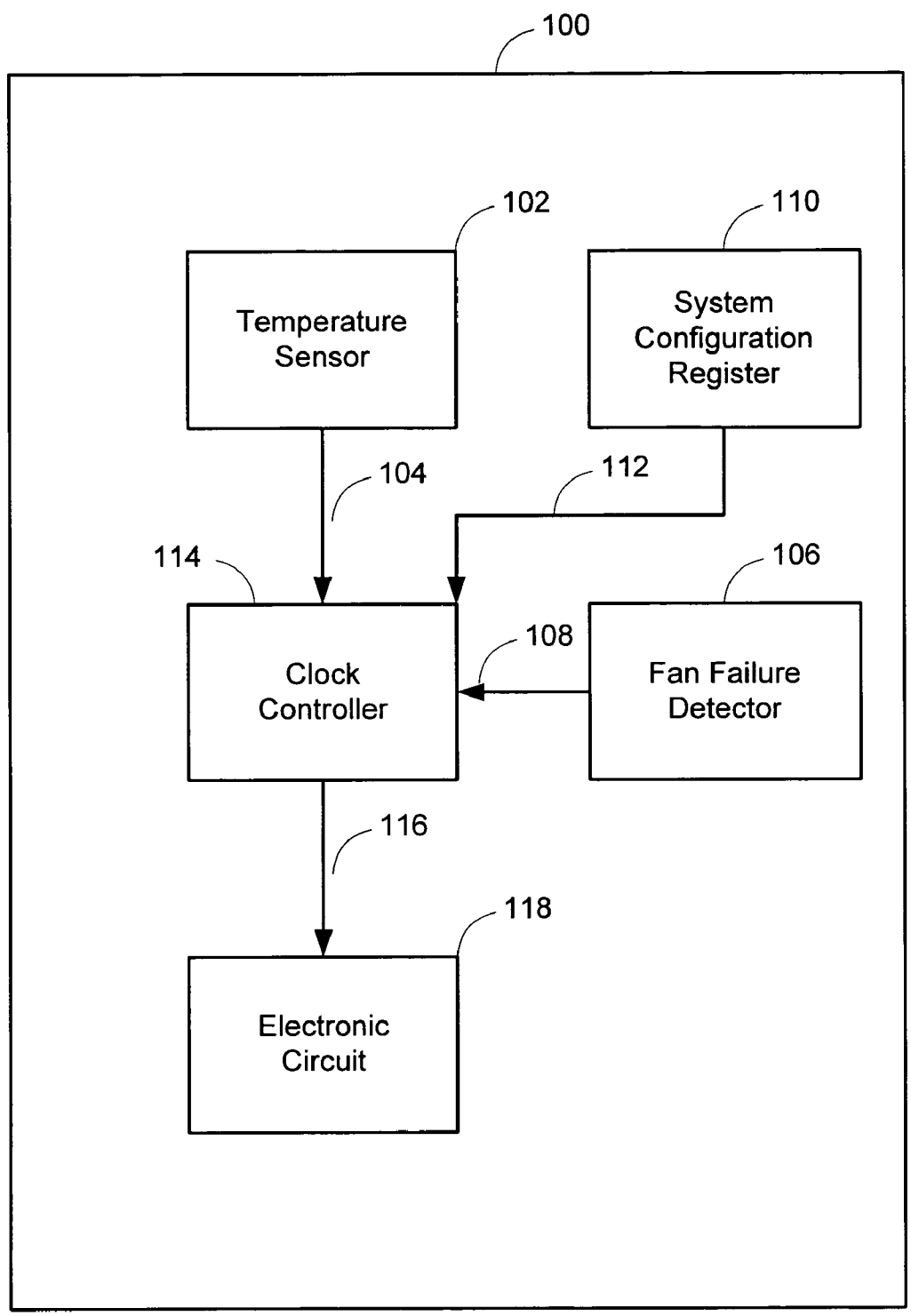
FIG. 1 is a block diagram of an example embodiment of an electronic device including a temperature-controlled clock according to the present invention.

FIG. 1 is a block diagram of an example embodiment of an electronic device 100 including a temperature-controlled clock according to the present invention. An electronic device 100 such as a computer, a printed circuit board, or an integrated circuit is built including a temperature sensor 102. This temperature sensor 102 may be implemented in a variety of different ways within the scope of the present invention. If the electronic device 100 is a computer or printed circuit board, the temperature sensor 102 may be a simple thermocouple that translates temperature to a voltage value. If the electronic device 100 is a single integrated circuit, the temperature sensor 102 may be a thermal diode fabricated within the integrated circuit. The temperature sensor 102 outputs a temperature signal 104. This temperature signal 104 may be a voltage or it may comprise digital data within the scope of the present invention. The temperature signal 104 is input to a clock controller 114. The clock controller 114 uses the temperature signal 104 to determine a frequency of operation. The clock controller 114 outputs a clock signal 116 for use by electronic circuits 118 within the electronic device 100. Those of skill in the art will recognize that a clock controller 114 may be comprise a phase-locked-loop, and the phase-locked-loop may be digital in some embodiments of the present invention. In an example embodiment of the present invention, as the temperature of the electronic device 100 rises, this temperature rise is reflected in the temperature data 104 received by the clock controller 114 and the frequency of the clock signal 116 is reduced as the temperature rises. As the temperature of the electronic device 100 cools, the clock controller 114 increases the frequency of the clock signal 116. In another example embodiment of the present invention, a system configuration register 110 contains information about the configuration of the electronic device 100 such as the number of fans available and their speed. System configuration data 112 is supplied to the clock controller 114 that then may respond to the configuration data 112 by changing the clock frequency, or waiting for a rise in temperature before adjusting the clock frequency. In another example embodiment of the present invention, a fan failure detector 106 may be used to send fan data 108 to the clock controller 114 that then may respond to the fan data 108 by changing the clock frequency, or waiting for a rise in temperature before adjusting the clock frequency. Variables such as any delay before changing the clock frequency, how much the clock frequency is allowed to vary, and response times of the clock may be determined by the designer of an embodiment of the present invention, all within the scope of the present invention.

Figure 2:
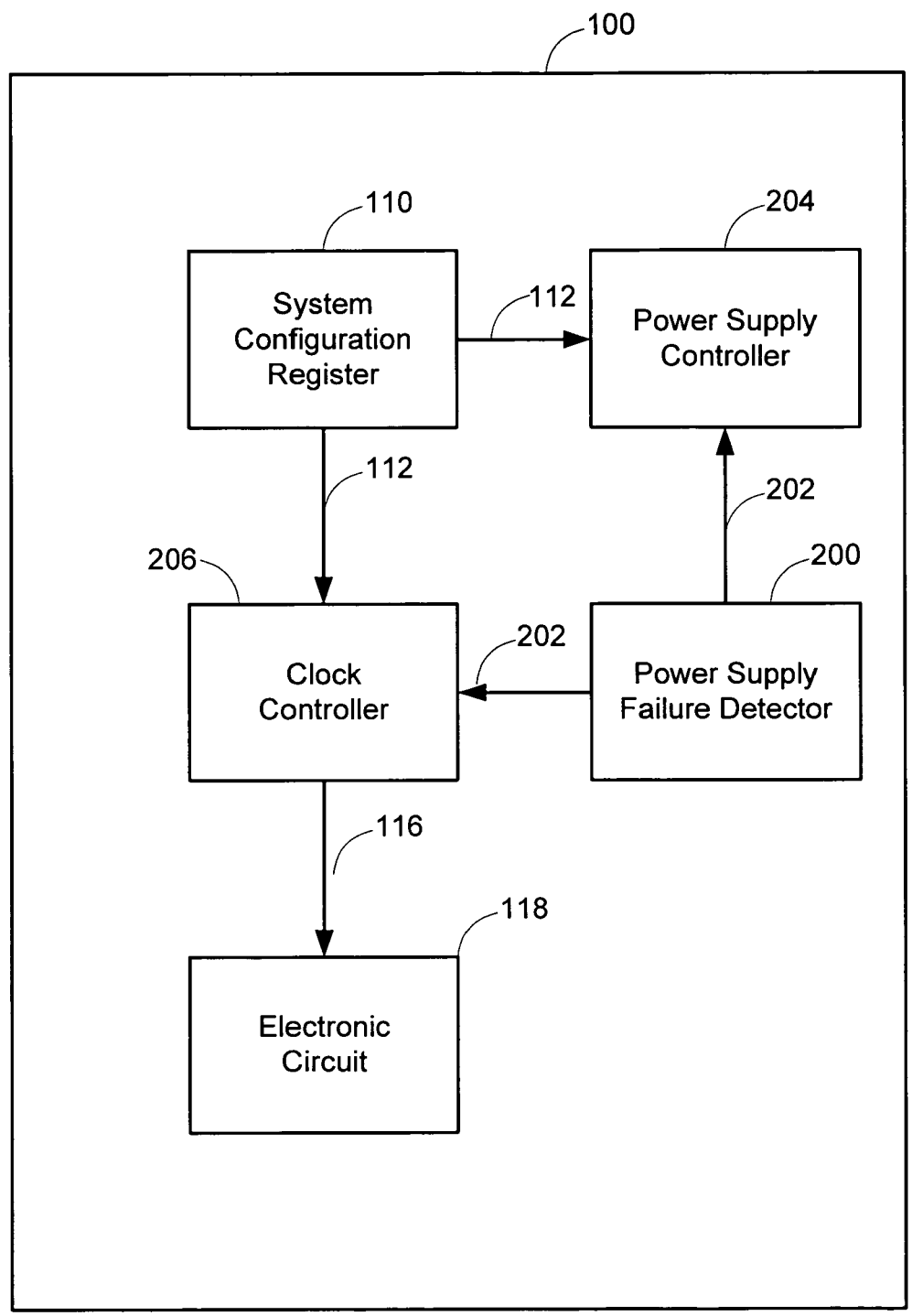
FIG. 2 is a block diagram of an example embodiment of an electronic device including a power supply failure sensitive clock according to the present invention.

FIG. 2 is a block diagram of an example embodiment of an electronic device 100 including a clock controller 208 and a power supply controller 204 according to the present invention. An electronic device 100 such as a computer, a printed circuit board, or an integrated circuit is built including a power supply failure detector 200. This power supply failure detector 200 may be implemented in a variety of different ways within the scope of the present invention. If the electronic device 100 is a computer or printed circuit board, the power supply failure detector 200 may be a signal from the power supply that is activated when the power supply goes into a failure mode, such as a current-limiting mode. The power supply failure detector 200 outputs a power fail signal 202. This power fail signal 202 may be a single bit signal, or it may comprise more complex digital data within the scope of the present invention. The power fail signal 202 is input to a clock controller 206 and a power supply controller 204. The clock controller 206 uses the power fail signal 202 to determine its frequency of operation. The clock controller 206 outputs a clock signal 116 for use by electronic circuits 118 within the electronic device 100. The power supply controller 204 uses the power fail signal to change the power supply voltage in response to power supply failures. For example, in a system comprising multiple power supplies, where one of the supplies fails, the remaining supplies may not have enough current capability to continue supplying the system with full voltage. In this case, it may be desired to reduce both the clock frequency and the power supply voltage in response to the failure since both heat and power consumption are proportional to the power supply voltage squared. Thus, a small decrease in power supply voltage may have a large effect on the power consumption of the electronic circuit 118. In another example embodiment of the present invention, a system configuration register 110 contains information about the configuration of the electronic device 100 such as the number of power supplies available and their status. System configuration data 112 is supplied to the clock controller 206 and the power supply controller 204 that then may respond to the configuration data 112 by changing the clock frequency and power supply voltage, or waiting for a change in device temperature before adjusting the clock frequency and power supply voltage. In another example embodiment of the present invention, a power supply failure detector 200 may be used to send power supply data 202 to the clock controller 208 and the power supply controller 204 that then may respond to the power supply data 202 by changing the clock frequency and power supply voltage, or waiting for a change in device temperature before adjusting the clock frequency and power supply voltage. Some embodiments of the present invention may allow only the clock frequency to be varied instead of both the power supply voltage and the clock frequency. Variables such as any delay before changing the clock frequency, how much the clock frequency is allowed to vary, and response times of the clock may be determined by the designer of an embodiment of the present invention, all within the scope of the present invention.

Figure 3:
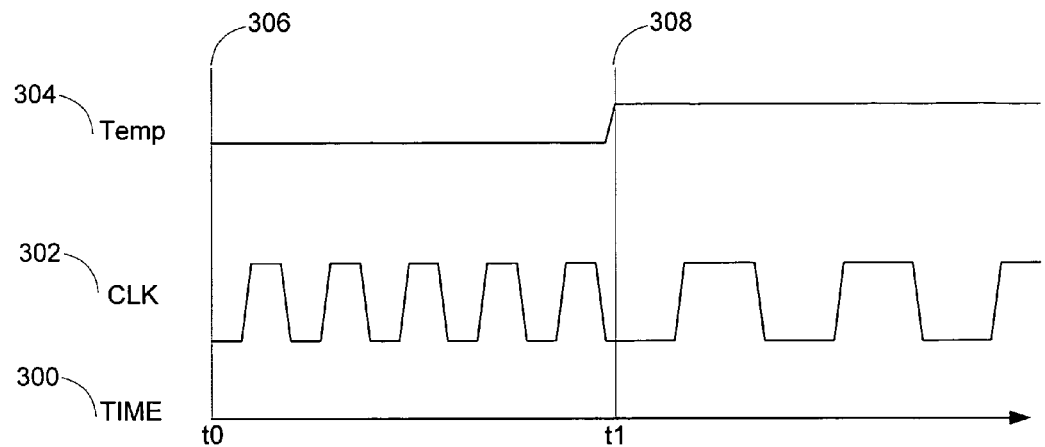
FIG. 3 is a waveform diagram of an example embodiment of a temperature-controlled clock according to the present invention.

FIG. 3 is a waveform diagram of an example embodiment of a temperature-controlled clock according to the present invention. The time axis 300 shows increasing time from left to right, including two specified times t0 306 and t1 308. Above the time axis 300 are drawn a clock signal 302 and a temperature 304. At time t0 306 the temperature 304 is steady and the clock signal 302 is at a steady frequency. At time t1 308 the temperature 304 rises and the frequency of the clock signal 302 decreases in response. In the example embodiment of the present invention corresponding to FIG. 3, the clock frequency changes by a factor of two. This is for illustrative purposes only as the clock frequency may change by any factor (or continuously) within the scope of the present invention.

Figure 4:
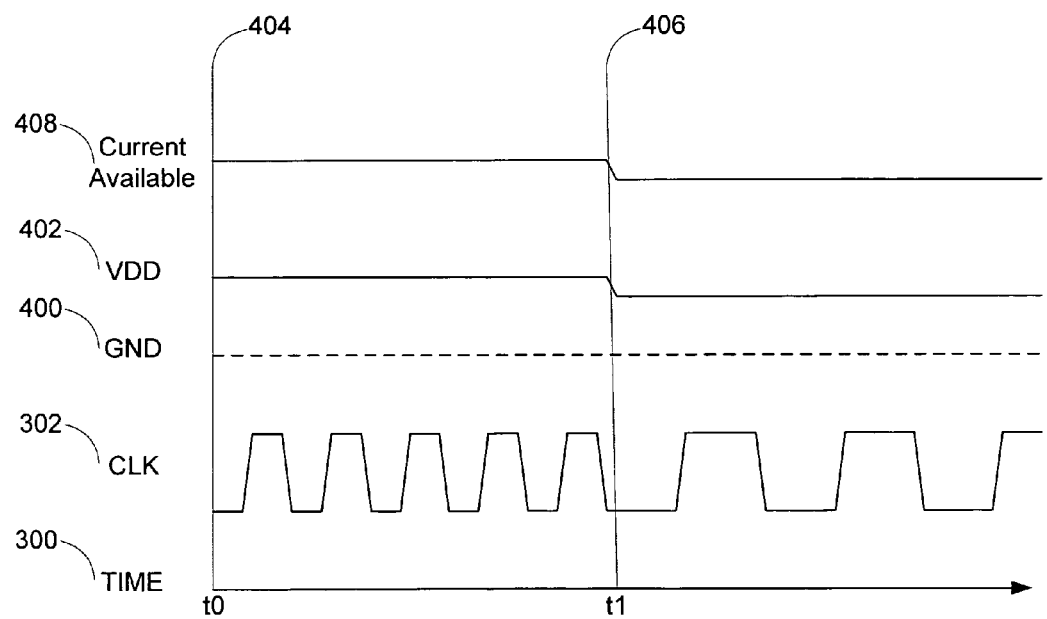
FIG. 4 is a waveform diagram of an example embodiment of a power supply failure sensitive clock according to the present invention.

FIG. 4 is a waveform diagram of an example embodiment of a power supply failure sensitive clock according to the present invention. The time axis 300 shows increasing time from left to right, including two specified times t0 404 and t1 406. Above the time axis 300, are drawn a clock signal 302 and a power supply voltage 402 at some voltage level above ground 400. Also, above the power supply voltage 402 is a line representing the maximum power supply current available 408. At time t0 404 the maximum power supply current available 408 is steady and the clock signal 302 is at a steady frequency. At time t1 406 the maximum power supply current available 408 decreases and the frequency of the clock signal 302 decreases in response. Also, the power supply voltage 402 decreases in response to the decreased supply current available 408. In some example embodiments of the present invention, it may be desired to only change the clock frequency and not adjust the power supply voltage levels. However, since heat and power consumption vary with the square of the power supply voltage, a small change in supply voltage may have a large change in heat and power consumption. In the example embodiment of the present invention corresponding to FIG. 4, the clock frequency changes by a factor of two. This is for illustrative purposes only as the clock frequency may change by any factor (or continuously) within the scope of the present invention.

Figure 5:
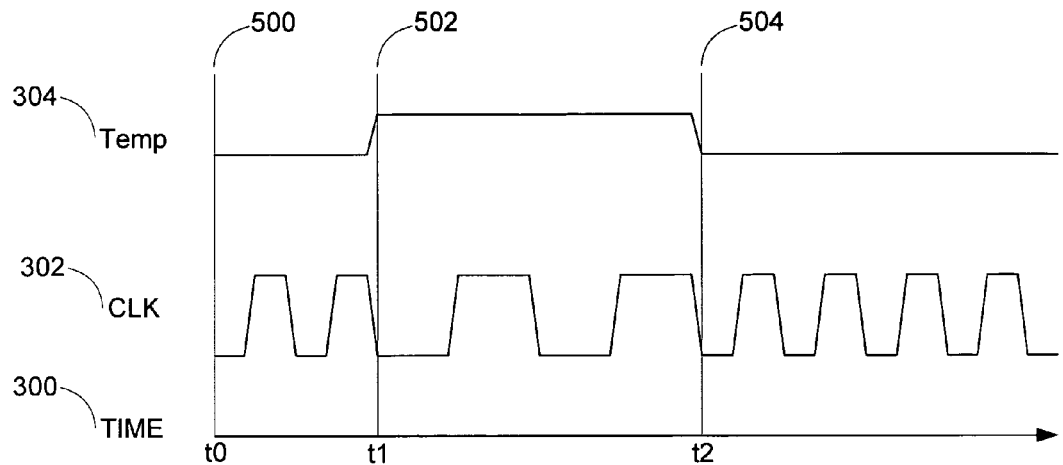
FIG. 5 is a waveform diagram of an example embodiment of a temperature-controlled clock according to the present invention.

FIG. 5 is a waveform diagram of an example embodiment of a temperature-controlled clock according to the present invention. The time axis 300 shows increasing time from left to right, including three specified times t0 500, t1 502, and t2 504. Above the time axis 300 are drawn a clock signal 302 and a temperature 304. At time t0 500 the temperature 304 is steady and the clock signal 302 is at a steady frequency. At time t1 502 the temperature 304 rises and the frequency of the clock signal 302 decreases in response. At time t2 504 the temperature 304 returns to its previous level and the frequency of the clock signal 302 increases back to its previous rate in response to the change in temperature 304. In the example embodiment of the present invention corresponding to FIG. 5, the clock frequency changes by a factor of two. This is for illustrative purposes only as the clock frequency may change by any factor (or continuously) within the scope of the present invention.

Figure 6:
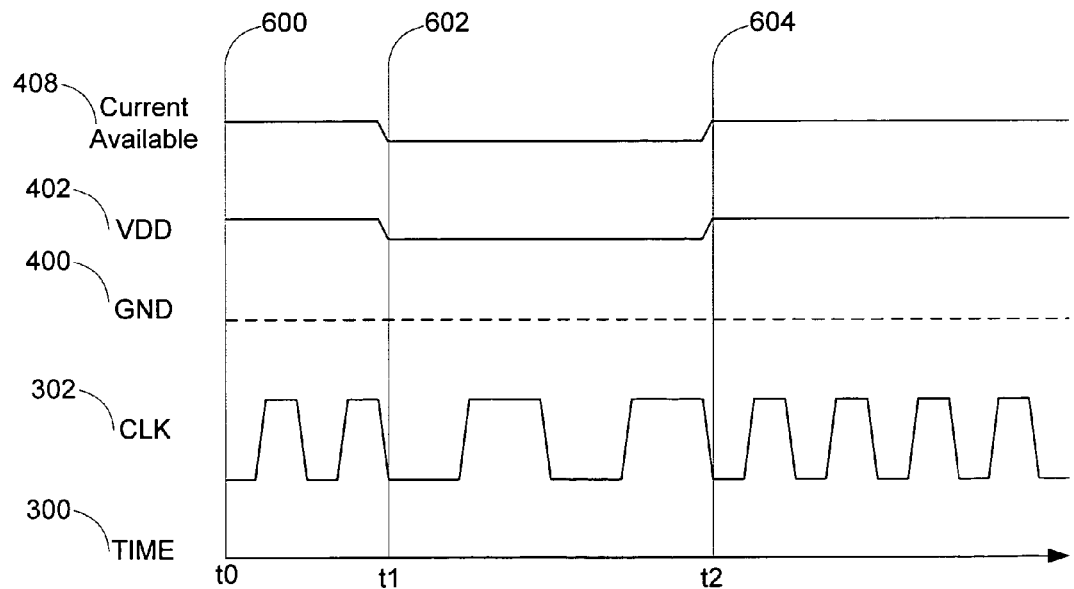
FIG. 6 is a waveform diagram of an example embodiment of a power supply failure sensitive clock according to the present invention.

FIG. 6 is a waveform diagram of an example embodiment of a power supply failure sensitive clock according to the present invention. The time axis 300 shows increasing time from left to right, including three specified times t0 600, t1 602, and t2 604. Above the time axis 300, are drawn a clock signal 302 and a power supply voltage 402 at some voltage level above ground 400. Also, above the power supply voltage 402 is a line representing the maximum power supply current available 408. At time t0 600 the maximum power supply current available 408 is steady and the clock signal 302 is at a steady frequency. At time t1 602 the maximum power supply current available 408 decreases and the frequency of the clock signal 302 decreases in response. Also, the power supply voltage 402 decreases in response to the decreased supply current available 408. At time t2 604 the maximum power supply current available 408 returns to its previous level and the frequency of the clock signal 302 increases back to its previous rate in response to the change in maximum power supply current available 408. Also, the power supply voltage 402 increases back to its previous level in response to the increased supply current available 408. In some example embodiments of the present invention, it may be desired to only change the clock frequency and not adjust the power supply voltage levels. However, since heat and power consumption vary with the square of the power supply voltage, a small change in supply voltage may have a large change in heat and power consumption. In the example embodiment of the present invention corresponding to FIG. 6, the clock frequency changes by a factor of two. This is for illustrative purposes only as the clock frequency may change by any factor (or continuously) within the scope of the present invention.

Figure 7:
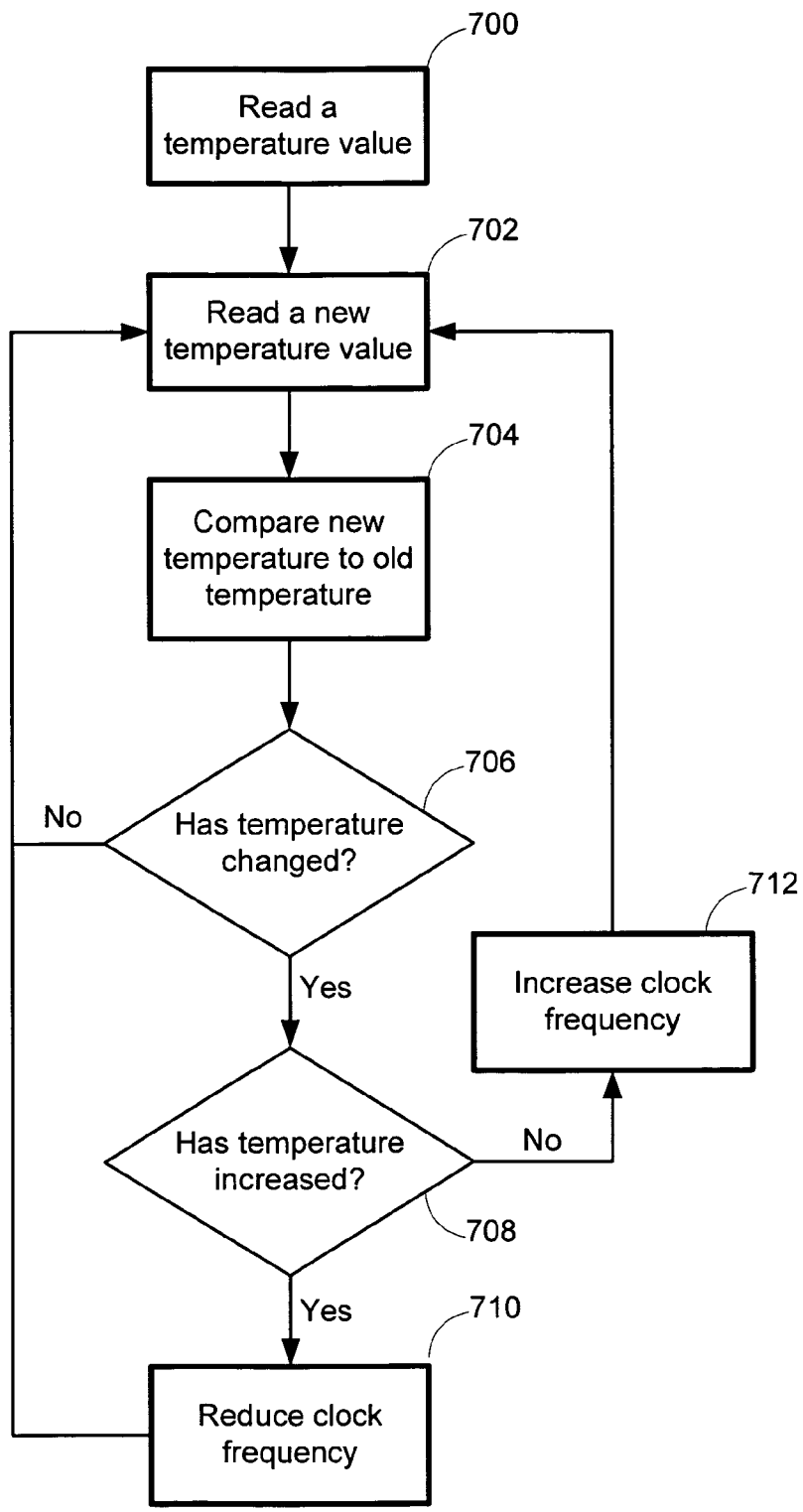
FIG. 7 is a flowchart of an example embodiment of a method for temperature controlling a clock according to the present invention.

FIG. 7 is a flowchart of an example embodiment of a method for temperature controlling a clock according to the present invention. In a step 700 a temperature value is read. In a step 702, after step 700, a new temperature value is read. In a step 704 the new temperature value is compared to the old (or previous) temperature value. In a decision step 706, if the temperature has not changed, control is given to step 702 and a new temperature value is read and the loop is repeated until the temperature changes. If the temperature has changed control is given to a decision step 708 where the method determines if the temperature has increased or decreased. If the temperature has increased, in a step 710, the clock frequency is decreased and control is passed back to step 702 for a new temperature reading. If the temperature has decreased, in a step 712, the clock frequency is increased and control is passed back to step 702 for a new temperature reading. The sampling rate of the configuration register may be continuous or determined by other factors within the scope of the present invention.

Figure 8:
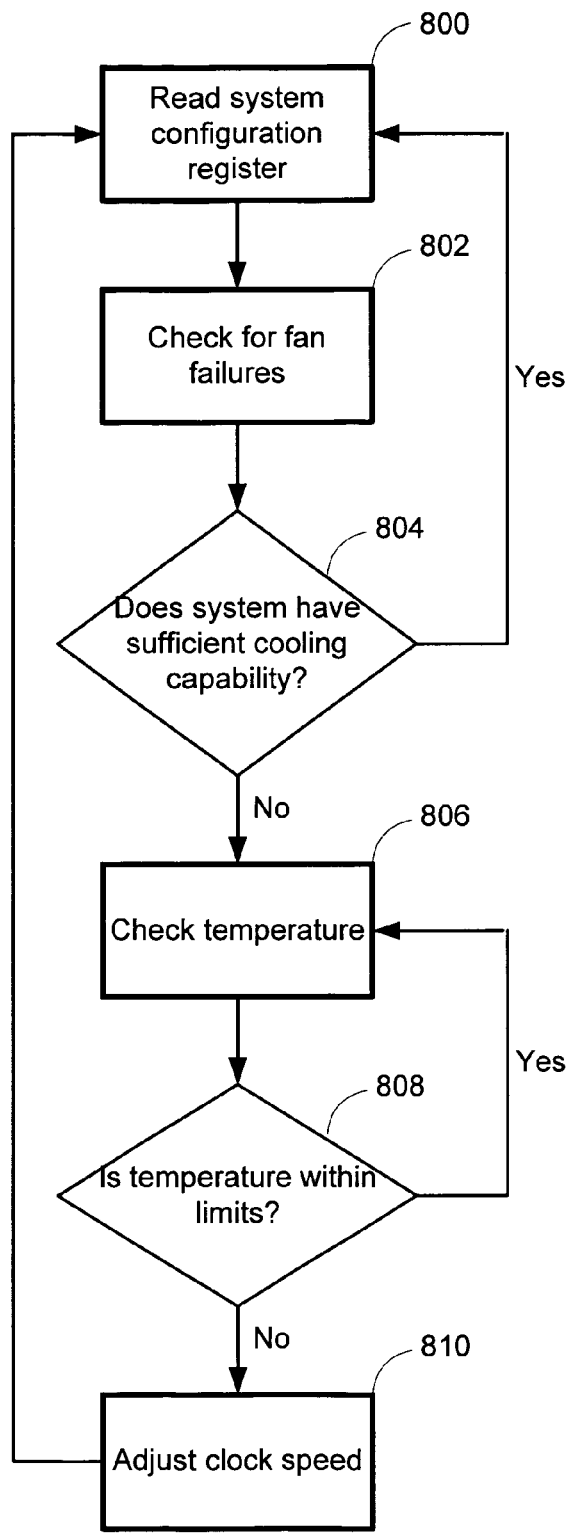
FIG. 8 is a flowchart of an example embodiment of a method for temperature controlling a clock according to the present invention.

FIG. 8 is a flowchart of an example embodiment of a method for temperature controlling a clock according to the present invention. In a step 800, a system configuration register 110 is read. This system configuration register 110 may contain information about the system such as the number of fans in operation, altitude of the system, number of processors, airflow requirements of the processors and other information about how the system is configured. Note that various embodiments of the present invention may include a variety of data in the system configuration register 110 within the scope of the present invention. In some embodiments of the present invention, there may not be a separate register containing this information, but the information is obtainable from other latches or registers throughout the system. In a step 802, the method checks for fan failures. This fan failure information may be contained within the system configuration register, or its equivalents, or it may be received from other mechanisms configured to detect fan failures. In a decision step 804, the system configuration data and fan failure data is analyzed to determine if the system, in its current configuration has sufficient cooling capability to maintain the circuits within their specified temperature ranges. If so, control loops back to step 800, and the process is repeated. If the system does not have sufficient cooling capability, the device temperature is checked in a step 806. In a decision step 808 the device temperature is compared to the operating limits of the device. If the device temperature is within the operating limits, control loops back to step 806, and the temperature is monitored within this loop until it exceeds the operating limits. If the device temperature is not within the operating limits, the clock speed is adjusted in a step 810. After adjusting the clock speed, control is returned to step 800 and the system monitoring continues. In some embodiments of the present invention, after the determination is made that the system does not have sufficient cooling capability to operate, the clock speed is immediately adjusted to account for the cooling capability of the system without going through the step of checking device temperature against the device specifications. If the results of a fan failure are known or calculable by the system, there is no need to check device temperatures before reacting to a fan failure. The sampling rate of the configuration register may be continuous or determined by other factors within the scope of the present invention.

Figure 9:
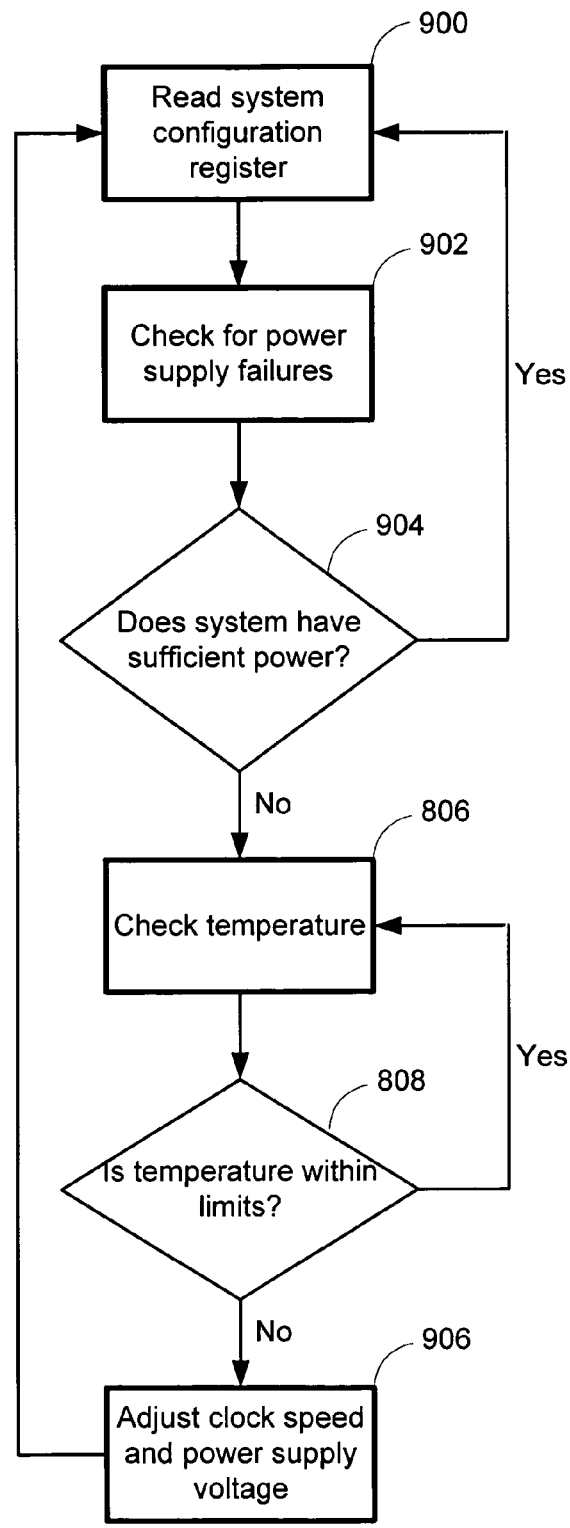
FIG. 9 is a flowchart of an example embodiment of a method for controlling a clock and power supply according to the present invention.

FIG. 9 is a flowchart of an example embodiment of a method for controlling a clock and power supply according to the present invention. In a step 900, a system configuration register 110 is read. This system configuration register 110 may contain information about the system such as the number of power supplies in operation, the output voltage and current of each of the supplies, number of processors, voltage requirements of the processors and other information about how the system is configured. Note that various embodiments of the present invention may include a variety of data in the system configuration register 110 within the scope of the present invention. In some embodiments of the present invention, there may not be a separate register containing this information, but the information is obtainable from other latches or registers throughout the system. In a step 902, the method checks for power supply failures. This power supply failure information may be contained within the system configuration register, or its equivalents, or it may be received from other mechanisms configured to detect power supply failures. In a decision step 904, the system configuration data and power supply failure data is analyzed to determine if the system, in its current configuration has sufficient voltage and current capability to maintain the circuits within their specified voltage ranges. If so, control loops back to step 900, and the process is repeated. If the system does not have sufficient power, the temperature is checked in a step 806. In a decision step 808 if the temperature is within the limits, control is returned to step 806 for further monitoring of the temperature. If the device temperature is not within the operating limits, the clock speed and power supply voltage are adjusted in a step 906. After adjusting the clock speed and power supply voltage, control is returned to step 900 and the system monitoring continues. In some embodiments of the present invention, after the determination is made that the system does not have sufficient power to operate, the clock speed is immediately adjusted to account for the voltage and current capability of the system without going through the step of checking device voltage against the device specifications. If the results of a power supply failure are known or calculable by the system, there is no need to check device temperatures before reacting to a power supply failure. The sampling rate of the configuration register may be continuous or determined by other factors within the scope of the present invention.

Figure 10:
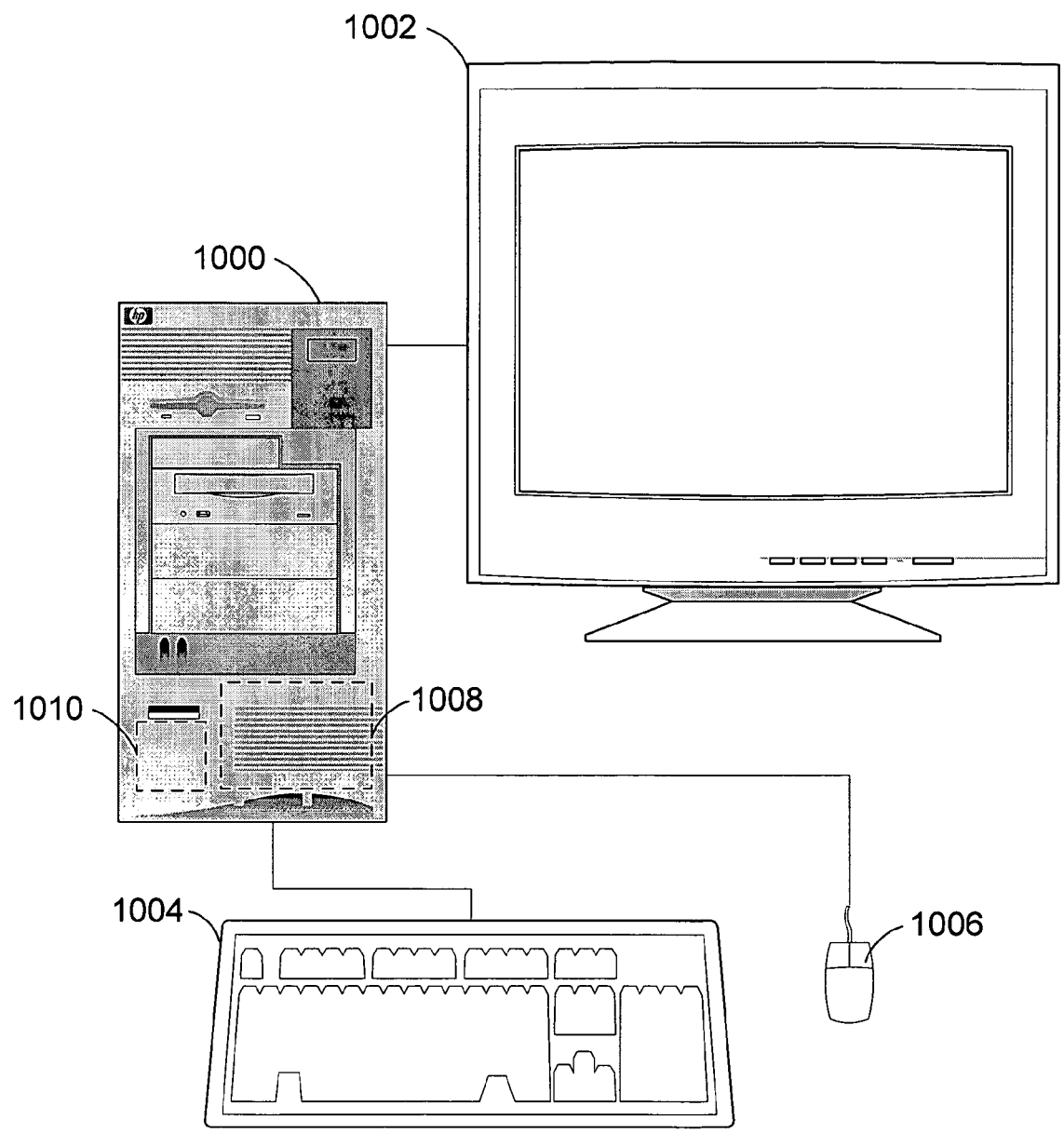
FIG. 10 is an example embodiment of a computer system including a self-adjusting clock according to the present invention.

FIG. 10 is an example embodiment of a computer system including a self-adjusting clock according to the present invention. In an example embodiment of a computer system including the present invention, a computer chassis 1000, including at least one power supply 1008 and at least one fan 1010 is built including at least one electronic circuit containing a self-adjusting clock according to the present invention. The computer receives input from the user via a mouse 1006 and a keyboard 1004 and outputs information or graphics to a display 1002. Many other uses of the present invention will be apparent to those of skill in the art, this is but one example usage of the present invention.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An electronic device comprising:
    a clock controller;
    a temperature sensor electronically coupled with the clock controller, the temperature sensor configured to output a temperature signal to the clock controller; and
    a configuration register electronically coupled with the clock controller, the configuration register configured to output current configuration information to the clock controller,
    wherein the clock controller is configured to receive the temperature signal from the temperature sensor and the current configuration information from the configuration register;
    wherein the clock controller is configured to reduce a frequency of operation if a temperature associated with the temperature signal rises a predetermined amount; and
    wherein the clock controller is configured to reduce the frequency of operation if the current configuration information indicates a predetermined condition.

2. The electronic device of claim 1, wherein the clock controller is further configured to increase the frequency of operation if a temperature associated with the temperature signal decreases a predetermined amount.

3. The electronic device of claim 1, further comprising:
    a fan failure detector electronically coupled with the clock controller, the fan failure detector configured to output a fan information to the clock controller,
    wherein the clock controller is configured to receive the fan information from the fan failure detector and, based on the fan information, reduce the frequency of operation.

4. The electronic device of claim 1, wherein the clock controller is configured to wait a predetermined amount of time before reducing the frequency of operation.

5. The electronic device of claim 1, wherein the predetermined condition is related to one of: number of operational fans, fan speed, altitude of the electronic device, air flow, and maximum power supply current available.

6. The electronic device of claim 1, wherein the frequency of operation may only be changed a predetermined amount.

7. The electronic device of claim 1, further comprising:
    a power supply controller,
    wherein the power supply controller is configured to reduce an operating voltage if a temperature associated with the temperature signal rises a predetermined amount or if the current configuration information indicates a predetermined condition.

8. A method for adjusting the operation of an electronic device comprising:
    outputting a temperature signal from a temperature sensor to a clock controller;
    outputting current configuration information form a configuration register to the clock controller;
    receiving, at the clock controller, the temperature signal and the current configuration information;
    reducing a frequency of operation if a temperature associated with the temperature signal rises a predetermined amount; and
    reducing the frequency of operation if the current configuration information indicates a predetermined condition.

9. The method for adjusting the operation of an electronic device of claim 8, further comprising:
    increasing the frequency of operation if a temperature associated with the temperature signal decreases a predetermined amount.

10. The method for adjusting the operation of an electronic device of claim 8, further comprising:
    outputting fan information to the clock controller; and
    reducing the frequency of operation based on the fan information.

11. A method for adjusting the operation of an electronic device comprising:
    reading a system configuration register;
    detecting, based on information received from the system configuration register, a power supply failure condition;
    determining if a current configuration of the electronic device has sufficient voltage and current capability to maintain one or more circuits of the electronic device specified voltage ranges;
    if the current configuration of the electronic device does not have sufficient voltage and current capability;
    checking a temperature associated with a temperature sensor and determining if the temperature is within predetermined operating limits;
    adjusting a frequency of operation and a power supply voltage if the temperature is not within the predetermined operating limits.

12. The method for adjusting the operation of an electronic device of claim 11, wherein said electronic device is a computer or an integrated circuit.

13. The method for adjusting the operation of an electronic device of claim 11, wherein the system configuration register comprises information related to a number of power supplies in operation, an output voltage of each power supply, an output current of each power supply, or information about the configuration of the electronic device.

14. An electronic device comprising:
   means for controlling a clock;
   means for sensing a temperature, the means for sensing a temperature configured to output a temperature signal to the means for controlling a clock; and
   means for registering system configuration, the means for registering system configuration configured to output current configuration information to the means for controlling a clock,
   wherein the means for controlling a clock is configured to receive the temperature signal from the means for sensing a temperature and the current configuration information from the means for registering system configuration;
   wherein the means for controlling a clock is configured to reduce a frequency of operation if a temperature associated with the temperature signal rises a predetermined amount; and
   wherein the means for controlling a clock is configured to reduce the frequency of operation if the current configuration information indicates a predetermined condition.

15. The electronic device of claim 14, wherein the means for controlling a clock increases the frequency of operation if a temperature associated with the temperature signal decreases a predetermined amount.

16. The electronic device of claim 14, wherein said electronic device is a computer.

17. The electronic device of claim 14, wherein said electronic device is an integrated circuit.

18. The electronic device of claim 14, wherein said means for controlling a clock includes a phase-locked loop.

19. The electronic device of claim 14, wherein the predetermined condition is related to one of: number of operation fans, fan speed, altitude of the electronic device, air flow, and maximum power supply current available.

20. The electronic device of claim 14 wherein the frequency of operation may only be changed a predetermined amount.

* * * * *

UNITED STATES PATENT AND TRADEMARK OFFICE
CERTIFICATE OF CORRECTION

PATENT NO.        : 7,577,862 B2
APPLICATION NO.   : 11/095826
DATED             : August 18, 2009
INVENTOR(S)       : Thomas W. McClendon et al.

Page 1 of 1

It is certified that error appears in the above-identified patent and that said Letters Patent is hereby corrected as shown below:

In column 12, line 18, in Claim 20, delete "claim 14" and insert -- claim 14, --, therefor.

Signed and Sealed this

Fourteenth Day of September, 2010

David J. Kappos
*Director of the United States Patent and Trademark Office*